(12) United States Patent
Oeschger

(10) Patent No.: US 7,342,847 B1
(45) Date of Patent: Mar. 11, 2008

(54) METHOD OF ESTIMATING ALONG-TRACK DISPLACEMENT OF AN UNDERWATER VEHICLE

(75) Inventor: John Oeschger, Lynn Haven, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/543,274

(22) Filed: Oct. 3, 2006

(51) Int. Cl.
*G01S 15/89* (2006.01)

(52) U.S. Cl. ........................................... 367/88

(58) Field of Classification Search ............... 367/88, 367/118
See application file for complete search history.

(56) References Cited

OTHER PUBLICATIONS

William W. Bonifant, Jr.; Interferometic Synthetic Aperture Sonar Processing; 1999; pp. 1-161.*
P. T. Gough and M. A. Miller; Improving the Quality of Synthetic Aperture Sonar Images Using Data-Driven Autofocus Techniques; Sep. 2003; pp. 677-680.*

* cited by examiner

*Primary Examiner*—Dan Pihulic
(74) *Attorney, Agent, or Firm*—James T. Shepherd

(57) ABSTRACT

A method is provided for along-track displacement of an underwater vehicle equipped with a synthetic aperture sonar (SAS) system. The SAS system is operated as the vehicle moves through the water. Using successively-detected acoustic signals, an actual redundant phase center overlap scenario is determined that is indicative of along-track displacement of the underwater vehicle occurring between the successively-detected acoustic signals.

9 Claims, 2 Drawing Sheets

METHOD OF ESTIMATING ALONG-TRACK DISPLACEMENT OF AN UNDERWATER VEHICLE

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to determining underwater vehicle displacement, and more particularly to a method of estimating the along-track displacement of an underwater vehicle equipped with a synthetic aperture sonar system where the method utilizes redundant phase centers.

BACKGROUND OF THE INVENTION

Underwater vehicles equipped with a high-fidelity "synthetic aperture sonar" (SAS) system must have the ability to properly compensate the system's acoustic data in order to determine vehicle motion. To determine vehicle displacements in a direction transverse to a vehicle's trajectory or track, "redundant phase centers" (RPC) are typically used to measure time delays and estimate displacements transverse to the nominal vehicle trajectory. This information is combined with inertial measurement unit data and used to appropriately compensate the acoustic data for transverse deviations and rotations of the vehicle from an ideal track. With respect to the vehicle's "along-track" (AT) motion, it is often assumed that the vehicle can correctly determine its own "speed over the ground" (SOG). If this were the case, the along-track sampling of the synthetic array is uniformly spaced by synchronization of the ping time interval such that the integration of the SOG with time equals a system-designated "advance per ping" (APP). Unfortunately, the underwater environment can affect the vehicle's along-track motion such that the actual APP is different from the system-designated APP. In instances where the SOG is not known to a sufficient accuracy to allow recalculation of the actual APP, the underwater vehicle's actual APP cannot be accurately determined.

SUMMARY OF THE INVENTION

Accordingly, it is an object of the present invention to provide a method of estimating along-track displacement of an underwater vehicle.

Another object of the present invention is to provide a method of using redundant phase centers in order to estimate the along-track displacement of an underwater vehicle equipped with a synthetic aperture sonar system.

Other objects and advantages of the present invention will become more obvious hereinafter in the specification and drawings.

In accordance with the present invention, a method is provided for estimating along-track displacement of an underwater vehicle equipped with a synthetic aperture sonar (SAS) system that includes a transmitter and a plurality of spaced-apart receivers linearly aligned along the vehicle. The SAS system is operated as the vehicle moves through the water so that (i) the transmitter transmits first and second acoustic transmissions into the water, and (ii) the receivers detect first and second acoustic signals caused by the first and second acoustic transmissions, respectively. Using the detected acoustic signals, an actual redundant phase center overlap scenario is determined that is indicative of along-track displacement of the underwater vehicle occurring between detections of the first and second acoustic signals.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
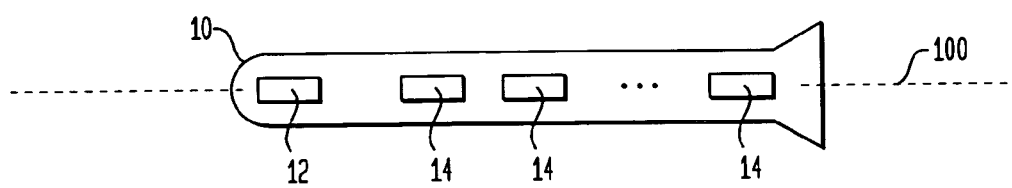
FIG. 1 is a schematic view of an underwater vehicle equipped with a transmitter and multiple receivers that form part of the vehicle's synthetic aperture sonar system.

Prior to describing the present invention's method of estimating an underwater vehicle's along-track displacement, reference will be made to FIG. 1 where an underwater vehicle 10 is shown. Vehicle 10 is assumed to be moving from right to left along a direction of travel or "track" referenced by dashed line 100. Vehicle 10 is equipped with a "synthetic aperture sonar" (SAS) system that, as is well known in the art, includes an acoustic transmitter 12 and an acoustic array defined by a plurality of acoustic receivers 14. More specifically, receivers 14 are typically spaced apart from one another in a line along an axis of vehicle 10 such that receivers 14 coincide with track 100 as vehicle 10 moves through the water.

As vehicle 10 moves through the water along track 100, the SAS system causes acoustic transmitter 12 to emit acoustic transmissions or "pings" that are spaced apart in time. Each successive ping is detected by each of receivers 14 where each receiver 14 defines a channel of the acoustic array. As vehicle 10 moves, the location of each receiver 14 shifts along track 100 between successive acoustic signal detections. This shift or "along-track" (AT) displacement is estimated in the present invention using "redundant phase centers" (RPCs).

By way of a simple example, the concept of RPCs and overlaps thereof will be described with the aid of FIG. 2 where it is assumed that there are M receive channels (i.e., M receivers 14) used to detect successive pings denoted as "Ping P-1" and "Ping P". Each rectangle in the rows "Ping P-1" and "Ping P" represents an RPC channel. In this example, the vehicle has moved along track 100 from right to left during the time between receipt of "Ping P-1" and "Ping P" such that there is a perfect two-channel RPC overlap where (i) RPC channel 1 of "Ping P-1" perfectly overlaps RPC channel M-1 of "Ping P", and (ii) RPC channel 2 of "ping P-1" perfectly overlaps RPC channel M of "Ping P".

In this example, the AT RPC overlap is perfect and is, therefore, defined by an integer, i.e., two.

In the ideal scenario, an underwater vehicle mission is programmed (i.e., vehicle speed and SAS system operation) to maintain a particular AT RPC overlap scenario. However, in real world operations, vehicle speed can be affected by the environment (e.g., waves, currents, sound speed, etc.) such that the ideal programmed scenario is not maintained. Accordingly, the present invention is a method to determine the vehicle's along-track displacement between successive pings or the vehicle's actual "advance per ping" or APP as it is also known.

In general, the present invention uses the M channels of received acoustic data (resulting from the detection of two successive pings from the SAS system's transmitter) to determine the vehicle's actual advance per ping. Briefly, the present invention determines the actual AT RPC overlap between two successive pings which is indicative of the along-track displacement of the vehicle during this time. More specifically, the acoustic data from two successively-detected pings is applied in cross-correlations for a number of possible AT RPC overlap scenarios to include the AT RPC overlap scenario that would occur in an ideal situation where the vehicle speed is exactly as programmed. The cross-correlation values associated with each AT RPC overlap scenario are averaged. The resulting set of averaged values is then used in an interpolation scheme to determine the actual AT RPC overlap scenario that is indicative of the vehicle's actual along-track displacement or APP.

To facilitate a better understanding of this process, an example will be presented herein. It is to be understood that this example is presented only to facilitate understanding of the present invention and is not a limitation thereof. For this example, it will be assumed that the AT RPC overlap scenario illustrated in FIG. 2 is indicative of the ideal AT RPC overlap scenario and will thus be defined to have an AT RPC offset (with respect to the ideal scenario) of zero. Four other possible AT RPC overlap scenarios are illustrated in FIGS. 3A-3D where FIG. 3A illustrates an AT RPC offset (with respect to the scenario shown in FIG. 2) of −1, FIG. 3B illustrates an AT RPC offset of −½, FIG. 3C illustrates an AT RPC offset of +½, and FIG. 3D illustrates an AT RPC offset of +1. It is to be understood that the present invention is not limited to the use of integer and one-half integer offsets as any offset can be used.

One or more cross-correlations of the detected acoustic pings are performed for each of the AT RPC overlap scenarios. The cross-correlations are performed for any of the perfectly overlapping channels. For any of the imperfectly overlapping channels, cross-correlations are performed at intermediate virtual channels where signals associated with adjacent channels are summed and cross-correlated with the nearest real channel. Note that the cross-correlation of intermediate virtual channels is simplified by using one-half integer offsets. For example, in FIG. 3B, the signal from channel 1 "Ping P-1" is cross-correlated with the sum of channels (M-2) and (M-1) from "Ping P". This scheme is repeated across the range of available channels.

Figure 2:
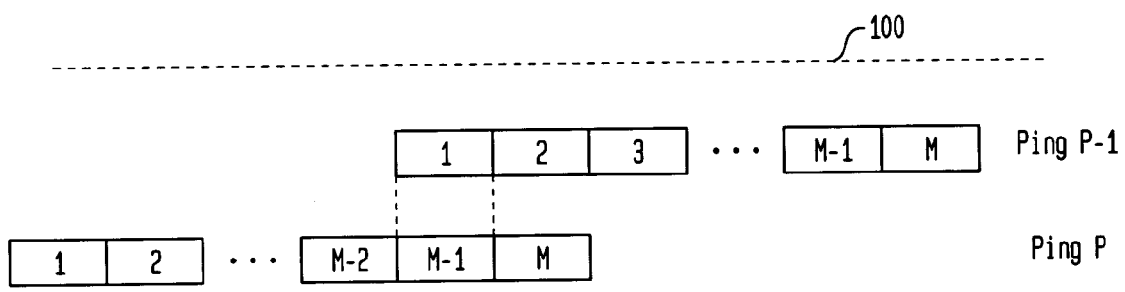
FIG. 2 is a diagram of an along-track redundant phase center overlap scenario between successively-detected acoustic pings for an M channel receiver array of a synthetic aperture sonar system.
Figure 3A:
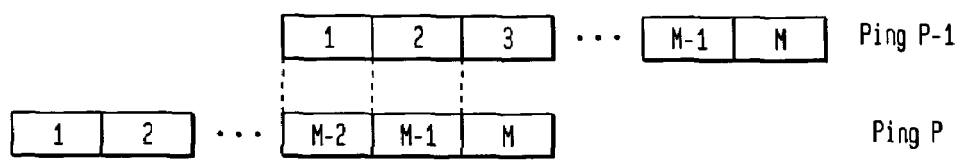
FIGS. 3A-3D are diagrams of other possible redundant phase center overlap scenarios used in the method of estimating along-track displacement in accordance with the present invention.
Figure 3B:
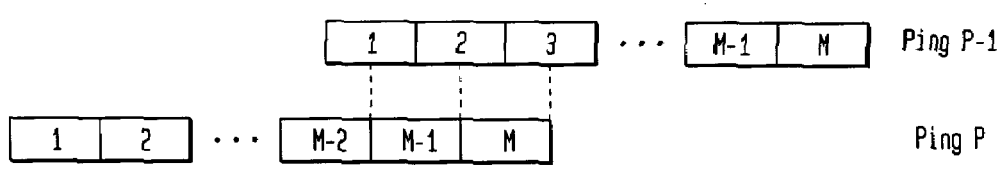
Figure 3C:
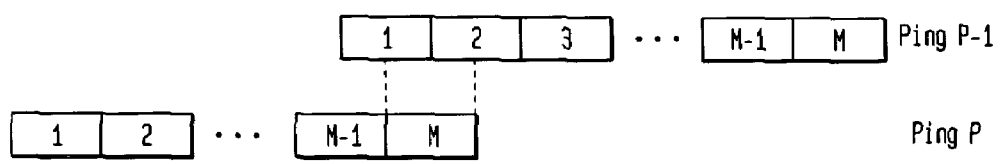
Figure 3D:
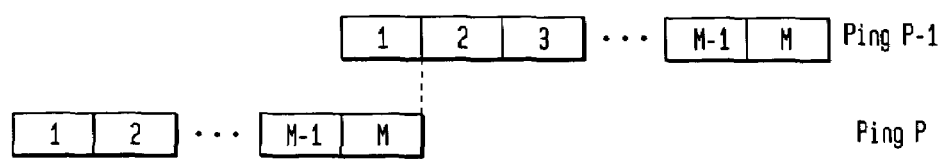

Using this technique for the case of a system with the ideal overlap scenario defined by two perfectly along-track overlapped redundant phase centers (as shown in FIG. 2), an along-track grid is set up with one-half phase center spacing ranging from a (−1) phase center offset up to a (+1) phase center offset. At each offset, there are various numbers of real and virtual channels that can be used to make cross-correlations. Table 1 shows the possible combinations for the case of this two redundant phase center overlap scenario.

TABLE 1

| AT RPC offset (−1) | AT RPC offset (−1/2) | AT RPC offset (0) | AT RPC offset (+1/2) | AT RPC offset (+1) |
|---|---|---|---|---|
| 1 ⊕ M − 2 | 1 ⊕ [(M − 2) + (M − 1)] | 1 ⊕ M − 1 | 1 ⊕ [(M − 1) + M] | 1 ⊕ M |
| 2 ⊕ M − 1 | [1 + 2] ⊕ [M − 1] | 1 ⊕ M | [1 + 2] ⊕ M | |
| 3 ⊕ M | 2 ⊕ [(M − 1) + M] | [1 + 2] ⊕ [(M − 1) + M] | | |
| [1 + 2] ⊕ [(M − 2) + (M − 1)] | [2 + 3] ⊕ M | | | |
| [2 + 3] ⊕ [(M − 1) + M] | | | | |

In TABLE 1, the columns represent the along track spacing in terms of AT RPC offset for the ideal overlap scenario of two perfectly-overlapped redundant phase centers. The "⊕" represents the cross-correlation operator. Entries represent the signals to be cross-correlated. Signals from "Ping P-1" are to the left of the ⊕ symbol, and signals from the next successive "Ping P" are to the right of the ⊕ symbol.

The cross-correlations are typically calculated using a sliding window. After calculating the cross-correlation of each entry in matrix shown in TABLE 1, the next step takes the average over a given cross-track range. The range can be set by some correlation threshold. Next, the columns of TABLE 1 are averaged so that there remains one cross-correlation value for each AT RPC offset scenario. The column with the maximum value and its two nearest "neighbors" (in terms of their values) are used to calculate the actual advance per ping (APP). The actual AT RPC in terms of an offset from the zero-offset AT RPC is determined using a three-point interpolator. The actual advance per ping is found by adding the calculated offset to the desired APP associated with the ideal AT RPC overlap scenario. This process is repeated for each successive ping. To get the "speed over the ground" (SOG), the actual advance per ping (occurring between "Ping P-1" and "Ping P") is simply divided by the time between "Ping P-1" and "Ping P".

The advantages of the present invention are numerous. The along-track displacement of an underwater vehicle equipped with a SAS system is readily determined without requiring any additional equipment. The method can be implemented in a real-time system and can be used to supplement the data generated by an inertial navigation system. In addition, the method of the present invention does not require knowledge of any environmental parameters such as the speed of sound through the water.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of estimating along-track displacement of an underwater vehicle, comprising the steps of:

providing an underwater vehicle equipped with a synthetic aperture sonar (SAS) system that includes a transmitter and a plurality of spaced-apart receivers linearly aligned along the vehicle;

operating said SAS system as the vehicle moves through the water so that (i) the transmitter transmits first and second acoustic transmissions into the water, and (ii) said receivers detect first and second acoustic signals caused by said first and second acoustic transmissions, respectively;

determining cross-correlations between said first and second acoustic signals for a plurality of possible along-track (AT) redundant phase center (RPC) overlap scenarios;

averaging said cross-correlations for each of said plurality of possible AT RPC overlap scenarios to generate an average cross-correlation value for each of said plurality of possible AT RPC overlap scenarios, wherein a corresponding plurality of average cross-correlation values are generated; and determining a peak cross-correlation value using said plurality of average cross-correlation values, said peak cross-correlation value corresponding to an actual AT RPC overlap scenario that is indicative of along-track displacement of the underwater vehicle occurring between detections of said first and second acoustic signals.

2. A method according to claim 1 wherein each of said plurality of possible AT RPC overlap scenarios is offset with respect to another of said plurality of possible AT RPC overlap scenarios by one of (i) an integer phase center offset, and (ii) a half-integer phase center offset.

3. A method according to claim 1 wherein said plurality of possible AT RPC overlap scenarios includes an ideal AT RPC overlap scenario indicative of an ideal amount of along-track displacement of the underwater vehicle between detection of said first and second acoustic signals.

4. A method according to claim 3 wherein each of said plurality of possible AT RPC overlap scenarios is offset with respect to said ideal AT RPC overlap scenario by one of (i) an integer phase center offset, and (ii) a half-integer phase center offset.

5. A method of estimating along-track displacement of an underwater vehicle, comprising the steps of:

providing an underwater vehicle equipped with a synthetic aperture sonar (SAS) system that includes a transmitter and a plurality of spaced-apart receivers linearly aligned along a direction of travel of the vehicle;

operating said SAS system as the vehicle moves through the water so that (i) the transmitter transmits time-separated first and second acoustic transmissions into the water, and (ii) said receivers detect first and second acoustic signals caused by said first and second acoustic transmissions, respectively, wherein the underwater vehicle experiences an along-track displacement along the direction of travel during the time between detection of said first and second acoustic signals;

determining cross-correlations between said first and second acoustic signals for a plurality of possible along-track (AT) redundant phase center (RPC) overlap scenarios;

averaging said cross-correlations for each of said plurality of possible AT RPC overlap scenarios to generate an average cross-correlation value for each of said plurality of possible AT RPC overlap scenarios, wherein a corresponding plurality of average cross-correlation values are generated; and determining a peak cross-correlation value using said plurality of average cross-correlation values, said peak cross-correlation value corresponding to an actual AT RPC overlap scenario that is indicative of the along-track displacement of the underwater vehicle.

6. A method according to claim 5 wherein each of said plurality of possible AT RPC overlap scenarios is offset with respect to another of said plurality of possible AT RPC overlap scenarios by one of (i) an integer phase center offset, and (ii) a half-integer phase center offset.

7. A method according to claim 5 wherein said plurality of possible AT RPC overlap scenarios includes an ideal AT RPC overlap scenario indicative of an ideal amount of along-track displacement of the underwater vehicle between detection of said first and second acoustic signals.

8. A method according to claim 7 wherein each of said plurality of possible AT RPC overlap scenarios is offset with respect to said ideal AT RPC overlap scenario by one of (i) an integer phase center offset, and (ii) a half-integer phase center offset.

9. A method of estimating along-track displacement of an underwater vehicle, comprising the steps of:

providing an underwater vehicle equipped with a synthetic aperture sonar (SAS) system that includes a transmitter and a plurality of spaced-apart receivers linearly aligned along the vehicle;

operating said SAS system as the vehicle moves through the water so that (i) the transmitter transmits first and second acoustic transmissions into the water, and (ii) said receivers detect first and second acoustic signals caused by said first and second acoustic transmissions, respectively; and determining, using said first and second acoustic signals, an actual redundant phase center overlap scenario that is indicative of along-track displacement of the underwater vehicle occurring between detections of said first and second acoustic signals.

* * * * *